United States Patent
Halliburton (10) Patent No.: US 9,502,811 B1
(45) Date of Patent: Nov. 22, 2016

(54) PROCESS CONNECTOR DESIGN TO REDUCE OR ELIMINATE HOOP STRESS IN DIELECTRIC COMPONENTS

(71) Applicant: Honeywell International Inc., Morristown, NJ (US)

(72) Inventor: Charles David Halliburton, Port Moody (CA)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/794,719

(22) Filed: Jul. 8, 2015

(51) Int. Cl.
  *H01R 24/00* (2011.01)
  *H01R 33/22* (2006.01)
  *H01R 13/502* (2006.01)
  *H01R 43/16* (2006.01)

(52) U.S. Cl.
  CPC ............ *H01R 13/502* (2013.01); *H01R 43/16* (2013.01)

(58) Field of Classification Search
  CPC ............................ H01R 13/502; H01R 43/16
  USPC ....................................................... 439/660
  See application file for complete search history.

(56) References Cited

U.S. PATENT DOCUMENTS

| 7,255,002 B2 * | 8/2007 | Gravel ................. G01F 23/284 73/290 R |
|---|---|---|
| 2006/0225499 A1 | 10/2006 | Gravel et al. |
| 2013/0314275 A1 | 11/2013 | Fredriksson et al. |
| 2014/0125512 A1 | 5/2014 | Janitch |
| 2014/0151045 A1 * | 6/2014 | Galey .................... E21B 33/13 166/288 |
| 2014/0266864 A1 | 9/2014 | Fredriksson |

FOREIGN PATENT DOCUMENTS

WO     WO 2015/094562 A1     6/2015

OTHER PUBLICATIONS

International Search Report and Written Opinion of the International Searching Authority in PCT Application No. PCT/US2016/038331 dated Sep. 13, 2016, 12 pages.

* cited by examiner

*Primary Examiner* — Javaid Nasri (57) ABSTRACT

An apparatus includes a conductor configured to transport a signal, a male connector surrounding at least a portion of the conductor, and a load ring configured to secure the conductor. The apparatus also includes a female connector including an annular end forming a cavity configured to receive the load ring in a first portion of the cavity and at least a portion of the male connector in a second portion of the cavity. Sidewalls of the first portion of the cavity are configured to create a compressive radial force on an outer surface of the load ring to reduce hoop stress resulting from radially-offset longitudinal forces on the load ring.

20 Claims, 5 Drawing Sheets

PROCESS CONNECTOR DESIGN TO REDUCE OR ELIMINATE HOOP STRESS IN DIELECTRIC COMPONENTS

TECHNICAL FIELD

This disclosure relates generally to connectors. More specifically, this disclosure relates to a process connector design to reduce or eliminate hoop stress in dielectric components.

BACKGROUND

It is often necessary or desirable to measure the amount of material stored in a tank. This may be useful, for example, during loading of material into the tank or unloading of material from the tank. As particular examples, "custody transfers" and "weights and measures" often require highly accurate measurements from level gauging instruments installed on the roof of a tank.

Different types of level sensors can employ different types of measurement techniques to identify the level of material in a tank, such as ultrasonic, capacitive, optical, and microwave measurement techniques. Microwave-type level sensors typically transmit microwave signals at the material in a tank through free space or through a wire or other conductive structure and use reflections of the microwave signals to identify the top surface of the material in the tank. The latter approach is often referred to as guided wave radar (GWR).

SUMMARY

This disclosure provides a process connector design to reduce or eliminate hoop stress in dielectric components.

In a first embodiment, an apparatus includes a conductor configured to transport a signal, a male connector surrounding at least a portion of the conductor, and a load ring configured to secure the conductor. The apparatus also includes a female connector including an annular end forming a cavity configured to receive the load ring in a first portion of the cavity and at least a portion of the male connector in a second portion of the cavity. Sidewalls of the first portion of the cavity are configured to create a compressive radial force on an outer surface of the load ring to reduce hoop stress resulting from radially-offset longitudinal forces on the load ring.

In a second embodiment, an apparatus includes an annular end forming a cavity configured to receive a load ring in a first portion of the cavity and at least a portion of a male connector in a second portion of the cavity. The apparatus also includes an insert configured to support at least a portion of a conductor extending through the female connector, the load ring, and the male connector. Sidewalls of the first portion of the cavity are configured to create a compressive radial force on an outer surface of the load ring to reduce hoop stress resulting from radially-offset longitudinal forces on the load ring.

In a third embodiment, a method includes securing a conductor using a load ring received within a cavity of a female connector. The method also includes providing a male connector surrounding at least a portion of the conductor. The method further includes mating the female connector with the male connector. Sidewalls of the cavity of the female connector create a compressive radial force on an outer surface of the load ring to reduce hoop stress resulting from radially-offset longitudinal forces on the load ring.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Figure 1:
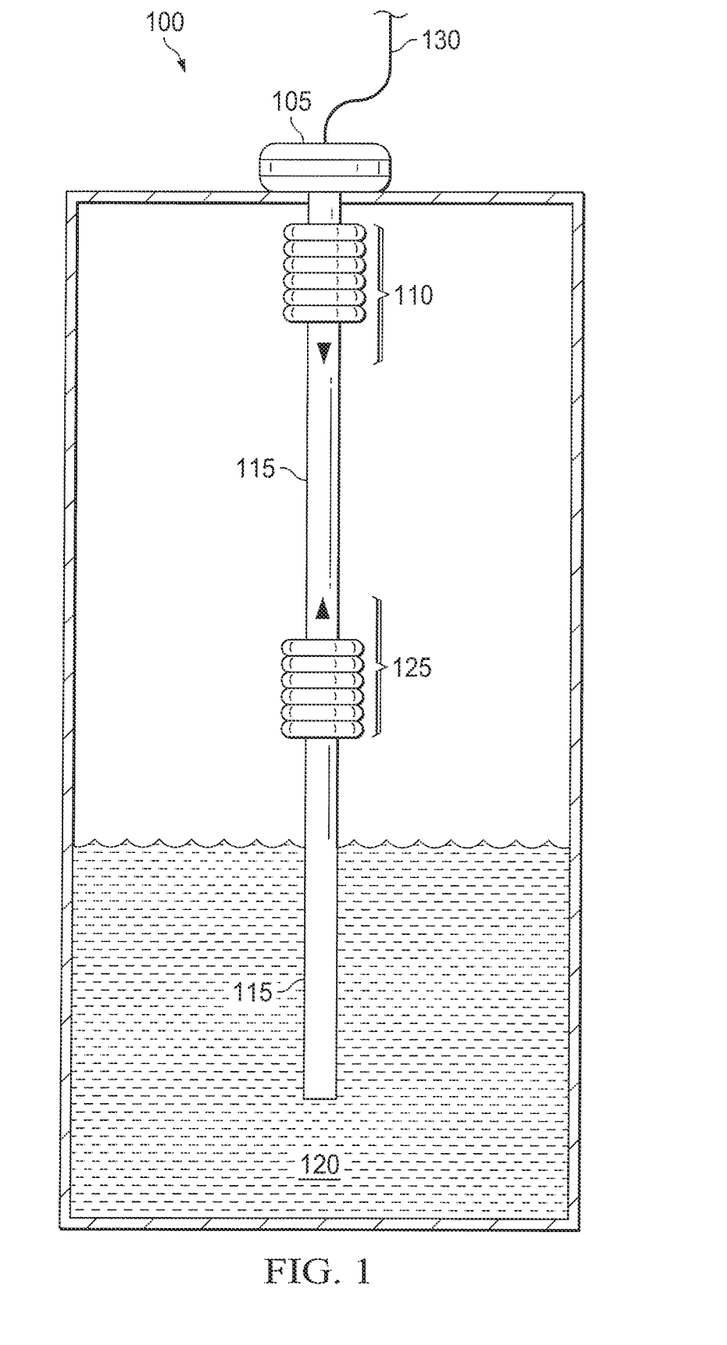
FIGS. 1 and 2 illustrate an example guided wave radar (GWR) level sensor according to this disclosure.
Figure 2:
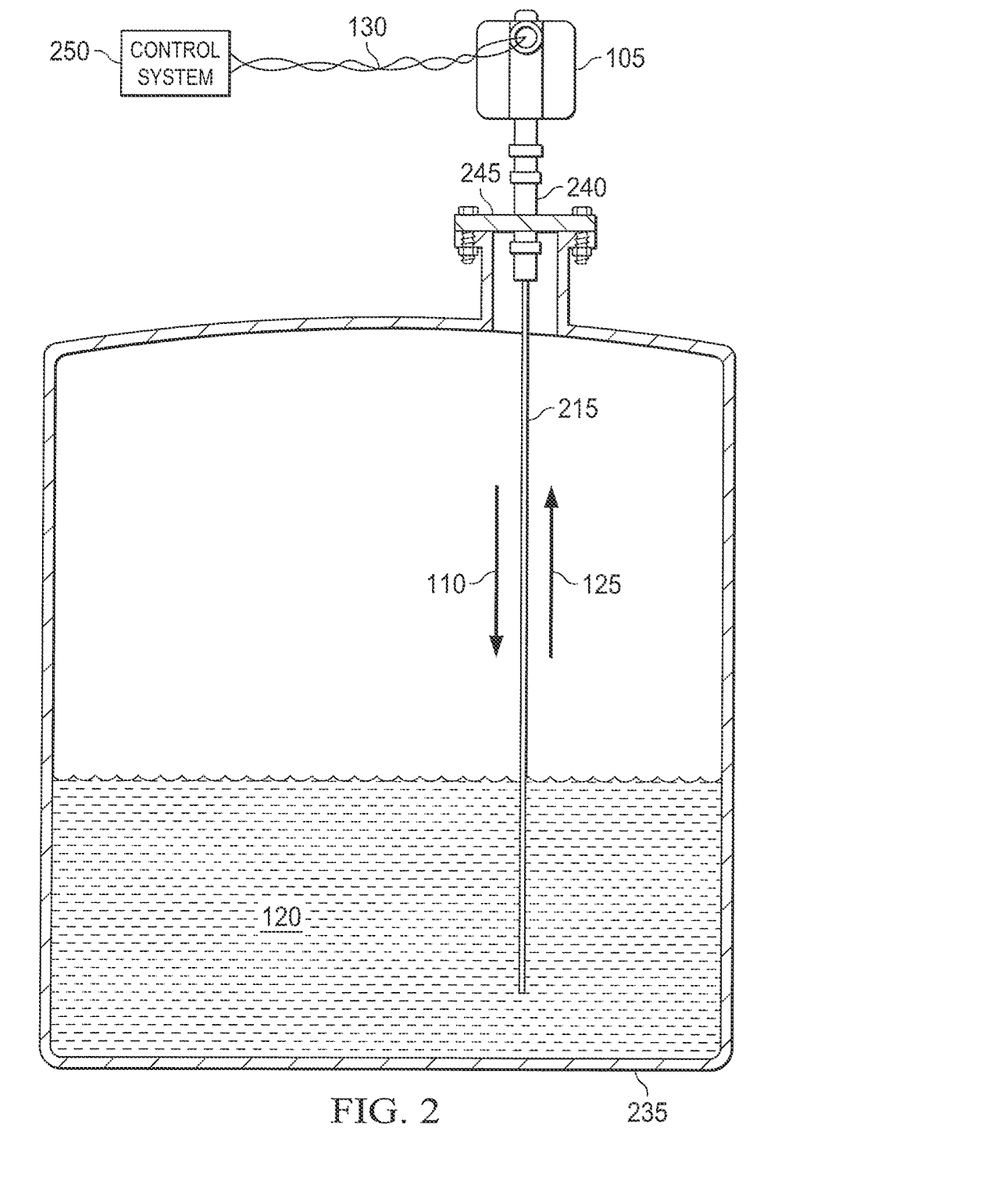

FIGS. 1 and 2 illustrate an example guided wave radar (GWR) level sensor 100 according to this disclosure. As shown in FIG. 1, the level sensor 100 utilizes a transceiver 105 to send transmitted pulses 110 through a waveguide 115. The waveguide 115 extends through an interior space of a tank, process fluid chamber, or other space into a process fluid 120. At least some of the transmitted pulses 110 are reflected from the surface of the process fluid 120 and travel back as reflected pulses 125 to the transceiver 105 through the waveguide 115. The transceiver 105 receives the reflected pulses 125, and the level sensor 100 calculates the level or height of the process fluid 120 in the space. For instance, the level sensor 100 could perform time-of-flight or other calculations to identify a distance from the transceiver 105 to the top of the process fluid 120. The level sensor 100 can use the calculated level of material in any suitable manner, such as by communicating the calculated distance to a control system or other destination(s) over at least one signaling medium 130. While the signaling medium 130 is shown here as a wired connection, other types of signaling media (such as wireless connections) could be supported by the level sensor 100.

The dielectric constant of the process fluid 120 causes of a variation in the impedance seen by the transmitted pulses 110 along the waveguide 115, which causes the reflected pulses 125 to return along the waveguide 115. When several process fluids have different dielectric constants and form multiple layers within the overall process fluid 120 (such as when an oil-based fluid, an emulsion or surfactant layer, and a water-based fluid are present), the level sensor 100 may be employed to measure the depth of each layer within the overall process fluid 120.

A load ring is typically used as part of a process connector to support the central conductor of a waveguide 115 and maintain a seal for the waveguide 115. Because the load ring is non-conducting, the load ring is often manufactured with weaker materials, such as non-metallic materials. The weaker materials can limit the design of a process connector when taking pressure, reaction load, and hoop stress into consideration. Hoop stress is defined as the mechanical stress applied in a direction perpendicular to the radius of the load ring. Hoop stress can be greater than compressive stress and is often the mechanism responsible when a process connector fails. Reducing hoop stress in a load ring can (i) provide a tolerance for higher process pressures and/or (ii) allow use of a weaker or less expensive material for the load ring.

As shown in FIG. 2, the level sensor 100 can used with a process fluid reservoir or tank 235, which contains the process fluid 120 (typically under pressure). A guide wire 215 serves as a waveguide in the example of FIG. 2 and extends into an interior of the tank 235 (often but not necessarily from the top of the tank 235) toward the bottom of the tank 235. Since the guide wire 215 should extend into the process fluid 120, the guide wire 215 could extend far enough through the interior of the tank 235 so that its bottom end is close to the bottom surface of the tank 235.

A process connector 240 connects the guide wire 215 to the transceiver 105. In this example, the process connector 240 is mounted on a bulkhead 245 over an opening in the tank 235, although the process connector 240 could be used in other ways. The transceiver 105 is communicably coupled by the signaling medium 130 to a control system 250. Note that while depicted as a simple twisted pair of conductors, the signaling medium 130 could denote any suitable analog or digital signaling media, including wired and wireless connections. As those skilled in the art will recognize, the control system 250 could communicate control signals to the level sensor 100 and receive level measurements from the level sensor 100 via the signaling medium 130.

As discussed above with respect to FIG. 1, transmitted pulses 110 from the transceiver 105 travel along the guide wire 215 to a location at which the guide wire 215 passes through the top surface of the process fluid 120. Reflected pulses 125 reflect at the surface of the process fluid 120 and are received by the transceiver 105. Logic (implemented within the level sensor 100, at the control system 250, or at other location(s)) can be employed to determine the level of the process fluid 120.

The process connector 240 here surrounds an electrical connection between the transceiver 105 and the guide wire 215. This allows electrical signals to and from the transceiver 105 to pass through the guide wire 215 while maintaining a seal with the tank 235. In accordance with this disclosure, the process connector 240 is designed to reduce hoop stress, which can help to reduce damage and prolong the operational lifetime of the process connector 240. Additional details regarding the design of the process connector 240 are provided below.

Although FIGS. 1 and 2 illustrate one example of a GWR level sensor, various changes may be made to FIGS. 1 and 2. For example, the process connector 240 described below could be used with other types of level sensors or other devices where at least one electrical connection is needed or desired. As a particular example, the process connector 240 could be used to allow electrical connection between an antenna within a tank and a transceiver or other circuitry outside the tank. Also, while FIG. 2 shows the use of a guide wire 215, other types of waveguides 115 could be used.

Figure 3:
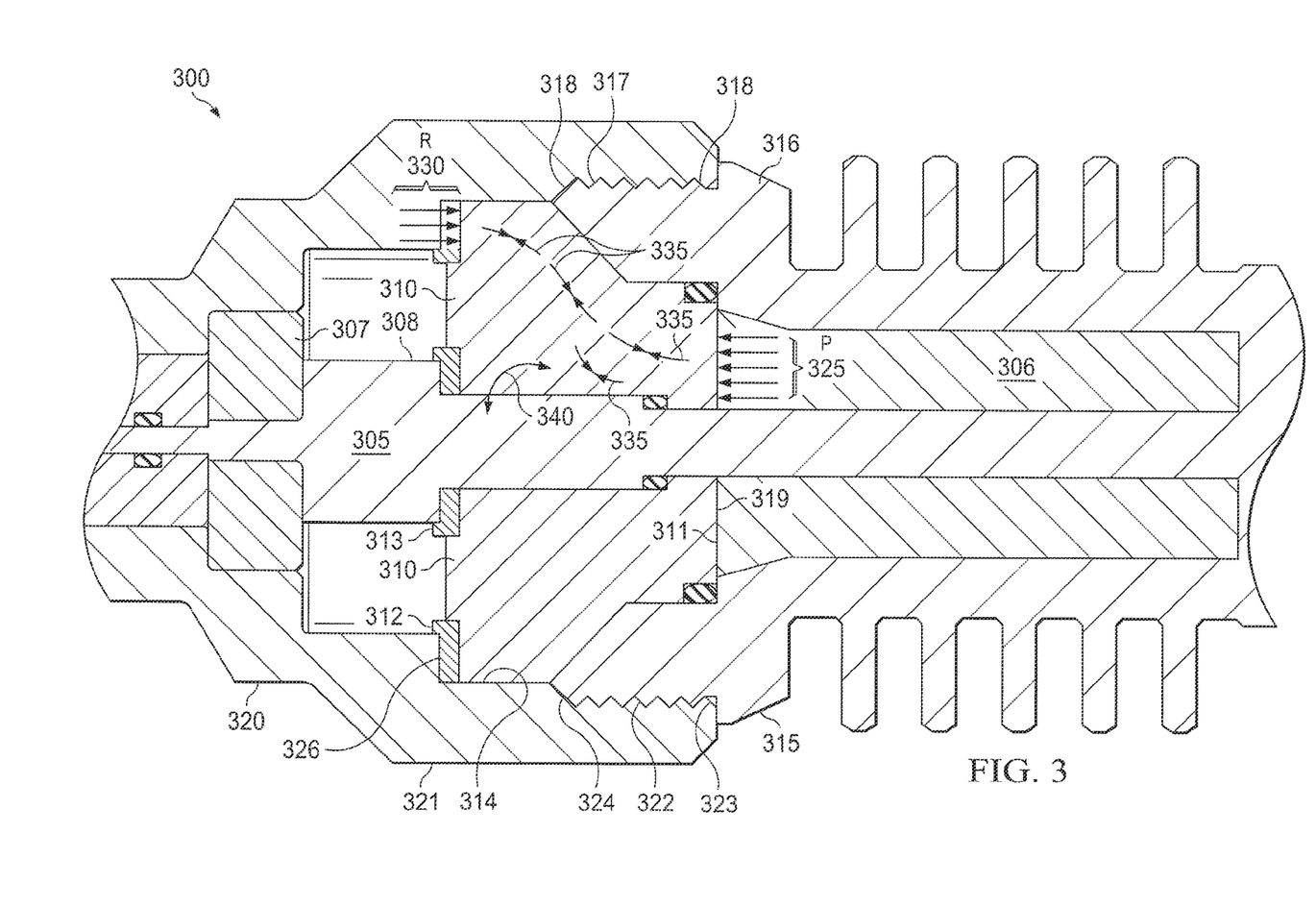
FIGS. 3 and 4 illustrate an example reduction of hoop stress in a connector according to this disclosure.
Figure 4:
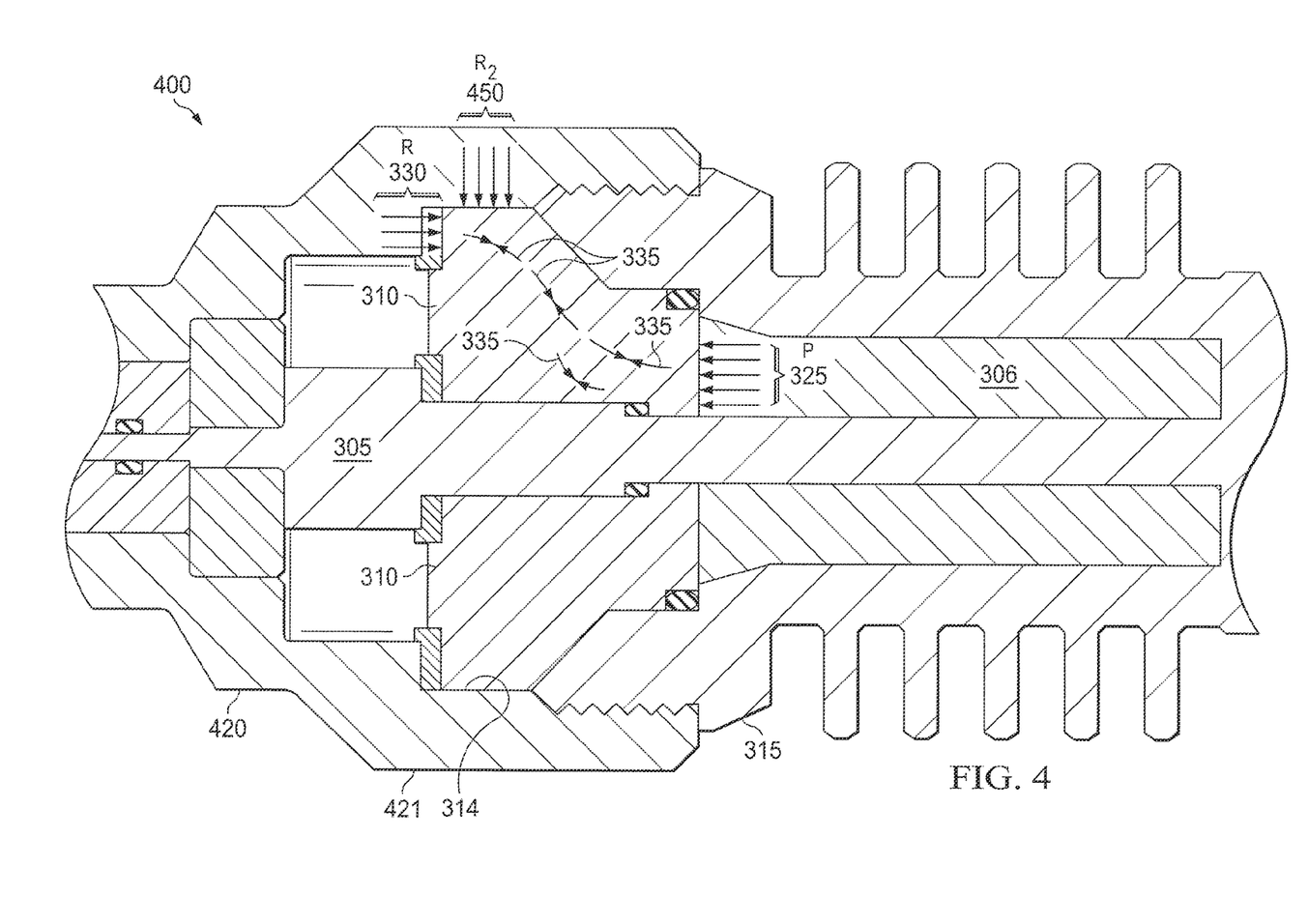

FIGS. 3 and 4 illustrate an example reduction of hoop stress in a connector according to this disclosure. In particular, FIG. 3 is a cutaway perspective view illustrating a process connector 300 with a load ring under process pressure and experiencing significant hoop stress. FIG. 4 is a cutaway perspective view illustrating a process connector 400 with a load ring under process pressure with a compressive radial force reducing the hoop stress.

As shown in FIG. 3, the process connector 300 includes various components that allow transmission of at least one electrical signal and could be employed as the process connector 240 in FIG. 2. The process connector 300 includes a central conductor 305, a load ring 310, a male connector 315, and an outer female connector 320. The female connector 320 includes an annular end 321 having an interior diameter sized to receive at least a portion of the male connector 315.

While in this example the process connector 300 is a press-fit connector with the male and female connectors 315 and 320 held together primarily by friction after connection, other types of connectors may also be used, for example, a threaded connection. Moreover, a retention assist may be provided to help hold the male and female connectors 315 and 320 together. In the example depicted, a slight protrusion 322 projects radially inward from an interior surface of the annular end 321. The protrusion 322 is spaced a small distance from the edge of the annular end 321 at the opening where the male connector 315 is inserted. The protrusion 322 is bracketed by two shallow recesses 323-324, with one recess 323 extending from the outermost side of the protrusion 322 to the edge of the annular end 321. The protrusion 322 and the recesses 323-324 cooperate with structures on the male connector 315 as described below to provide a retention assist.

The annular end 321 of the female connector 320 includes a shoulder 326 formed by a portion of the central cavity having a smaller interior diameter than the portion extending from the terminal edge and opening of the annular end 321. The shoulder 326 interacts with an outer circumferential corner 312 of the load ring 310 at a reaction end of the load ring 310. The interaction may be by direct contact or, as illustrated in the figure, via an intervening member (such as a thrust washer within recesses at corners 312-313 of the load ring 310 in the example depicted). As part of the interaction, reaction forces (R) 330 are applied by the shoulder 326 to the contacted corner 312 of the load ring 310. The inner surface of the annular end 321 may lightly contact an outer sidewall 314 of the load ring 310 nearest the reaction end of the load ring 310 or may be slightly spaced apart from that sidewall 314 as shown. In certain embodiments, the R 330 is applied using a conical shoulder. The central conductor 305 extends longitudinally through the female connector 320.

The male connector 315 includes an annular projection 316 at a terminal end, which is sized to be received within the annular end 321 of the female connector 320. An outer surface of the annular projection 316 includes a recess 317 bracketed by small protrusions 318 that are sized and shaped to match the protrusion 322 and recesses 323-324 on the interior surface of the annular end 321 of the female connector 320. Together, these features form the retention assist.

In the example depicted, the annular projection 316 includes a sloped interior surface forming a shallow, cone-shaped opening at the end thereof. An axial sidewall in the annular opening extends to a radial shelf 319 that contacts a process end 311 of the load ring 310. In the embodiment shown, the radial shelf 319 is formed by an annular tube-shaped insert 306 within the body of the male connector 315, although the body and insert could alternatively be integrally formed as a single piece. The radial shelf 319 interacts with the process end 311 of the load ring 310, exerting process forces (P) 325 on the process end 311 of the load ring 310. While direct contact between the radial shelf 319 and the process end 311 of the load ring 310 is shown, an intervening member may alternatively be employed. The central conductor 305 extends longitudinally through the male connector 315.

The central conductor 305 is used to transmit signals (such as electrical pulses) and is supported by the load ring 310. The male connector 315 and the outer female connector 320 create a mechanical connection to support the central conductor 305 and retain the central conductor 305 in place. The load ring 310 also seals the process connector 300 against leaks through the connection between the male and female connectors 315 and 320. The central conductor 305 could be supported within portions of the male and female connectors 315 and 320 by structures including a non-conducting material with favorable dielectric properties, such as the insert 306 within the male connector 315 and a similar annular disk-shaped insert 307 within the female connector 320. The central conductor 305 includes a retention block 308 having a larger outer circumference than remaining portions. One end of the retention block 308 can contact a radial face of the insert 307, while the other end of the retention block 308 can interact with an inner circumferential corner 313 of the reaction end of the load ring 310. The retention block 308 thus keeps the central conductor 305 from shifting longitudinally within the process connector 300.

In some embodiments, the load ring 310 is made of a dielectric material, such as a glass filled polyetheretherketone (PEEK) material. In particular embodiments, the load ring 310 is designed to provide up to 50 ohms of impedance or some other desired impedance value. Generally, dielectric materials are softer and weaker materials compared to metals, which creates a challenge when sealing against process pressures within the mechanical limits of the dielectric materials.

The longitudinal process forces 325 act on the process end 311 of the load ring 310. The longitudinal reaction forces 330 act on the outer circumferential corner 312 of the reaction end of the load ring 310 and are radially further from a central axis of the process connector 300 than the process forces 325. The process forces 325 and the reaction forces 330 cause internal stress, indicated by principal stress vectors 335 in the load ring 310. The stress vectors 335 have a radial component as well as a longitudinal component. The radial offset between the process forces 325 and the reaction forces 330 also cause hoop stress 340 in the load ring 310, such as in an inner annular sidewall of the load ring 310 near the inner circumferential corner 313. As described above, hoop stress can cause failure of the load ring 310, and such failure often requires a process to be taken offline in order to replace the load ring 310.

As shown in FIG. 4, the process connector 400 includes various components similar to the process connector 300. Descriptions of components with the same reference numerals as in FIG. 3 are omitted for brevity. In contrast with FIG. 3, however, the process connector 400 is designed to reduce hoop stress. The process connector 400 could be employed as the process connector 240 in FIG. 2.

The process connector 400 includes an outer female connector 420, a male connector 315, and a load ring 310 supporting a central conductor 305. The male connector 315, the load ring 310, and the central conductor 305 could be the same as or similar to the corresponding components in FIG. 3 described above.

An interior circumferential surface of a cavity formed by an annular end 421 of the female connector 420 contacts a lower sidewall 314 of the load ring 310. The female connector 420 therefore applies a compressive radial force $R_2$ 450 on the outer diameter of the load ring 310. The compressive force 450 applied to the lower sidewall 314 of the load ring 310 creates a radial loading and reduces or eliminates hoop stress.

The inner circumferential wall of the annular end 421 is sized so that, upon receiving the load ring 310 therein, radial pressure is exerted by the inner sidewalls of the annular end 421 on the outer surface of the load ring 310. In some embodiments, the outer female connector 420 is designed to use deflection to create the compressive force 450, although other approaches (including one described below) could also be used to create the compressive force 450.

Although FIGS. 3 and 4 illustrate one example of a reduction of hoop stress in a connector, various changes may be made to FIGS. 3 and 4. For example, the relative sizes and shapes of different components within the connectors are for illustration only.

Figure 5:
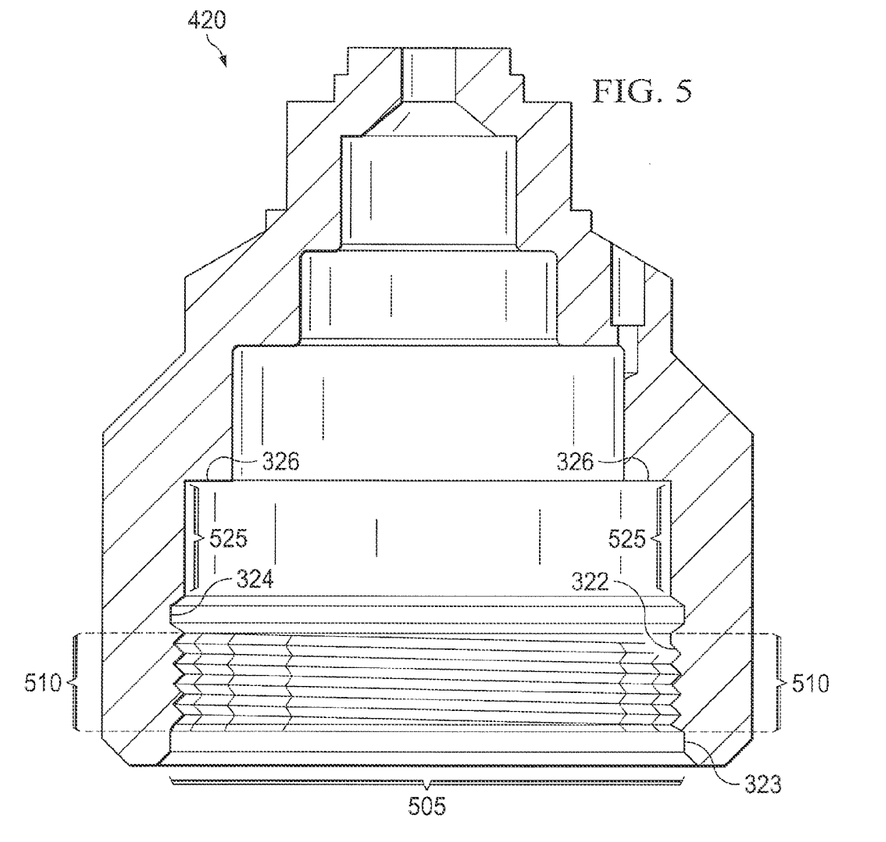
FIG. 5 illustrates an example technique for forming compressive radial forces in a connector to reduce hoop stress according to this disclosure.

FIG. 5 illustrates an example technique for forming compressive radial forces in a connector to reduce hoop stress according to this disclosure. In particular, FIG. 5 illustrates one example implementation of the outer female connector 420 that generates the compressive force 450.

As shown in FIG. 5, the outer female connector 420 includes an opening 505 for receiving at least a portion of the male connector 315. The female connector 420 also includes a mating section 510 designed to mate with a counterpart portion of the male connector 315 in order to secure the connection between the components 315 and 420. The mating section 510 can be located closest to the opening 505 and can be designed with the largest inner diameter. The mating section 510 includes the elevated portion or protrusion 322 and recesses 323-324. The protrusion 322 and recesses 323-324 allow for mating of the outer female connector 420 and the male connector 315 without interfering with the compressive force of a compressive section 525.

The compressive section 525 is designed to create the compressive radial force 450 against the outer diameter of the load ring 310. The diameter of the compressive section 525 is smaller than the diameter of the mating section 510. In some embodiments, the diameter of the compressive section 525 is about 75 mm, and the diameter of the mating section 510 is about 78 mm. The outer female connector 420 further includes the reaction surface 326 for bearing the reaction load from the load ring 310 created by process pressure.

Although FIG. 5 illustrates one example of a technique for forming compressive radial forces in a connector to reduce hoop stress, various changes may be made to FIG. 5. For example, the relative sizes and shapes of different components within the connector are for illustration only.

Figure 6:
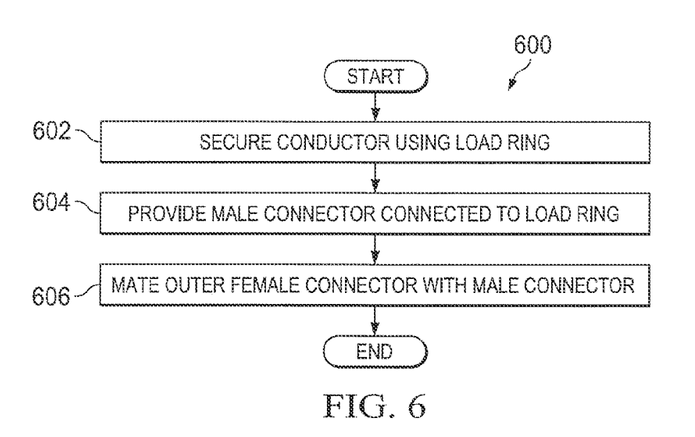
FIG. 6 illustrates an example method for reducing hoop stress in a connector according to this disclosure.

FIG. 6 illustrates an example method 600 for reducing hoop stress in a connector according to this disclosure. For ease of explanation, the method 600 is described in connection with the process connector 400 of FIG. 4 and the outer female connector 420 of FIG. 5. However, the method 600 could involve the use of any components or devices.

A conductor is secured using a load ring at step 602. This could include, for example, inserting the central conductor 305 through the load ring 310. A retention block 308 of the central conductor 305 could be used to retain the central conductor 305 between the load ring 310 and the insert 307.

A male connector is connected to the load ring at step 604. This could include, for example, placing the male connector 315 around the central conductor 305 and inserting a portion of the load ring 310 into the male connector 315. An insert 306 within the male connector 315 could be placed into contact with the load ring 310 during this step.

An outer female connector is mated with the male connector at step 606. This could include, for example, pushing at least part of the male connector 315 into the annular end 421 of the female connector 420 until the protrusions 318 lock into the recesses 323-324. As part of this step, compressive radial forces 450 are created by the female connector 420 against a portion of the outer sidewall 314 of the male connector 315. These compressive radial forces 450 reduce the hoop stress within the process controller.

Although FIG. 6 illustrates one example of a method 600 for reducing hoop stress in a connector, various changes may be made to FIG. 6. For example, various steps shown in FIG. 6 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a conductor configured to transport a signal;
   a male connector surrounding at least a portion of the conductor;
   a load ring configured to secure the conductor; and
   a female connector including an annular end forming a cavity configured to receive the load ring in a first portion of the cavity and at least a portion of the male connector in a second portion of the cavity;
   wherein sidewalls of the first portion of the cavity are configured to create a compressive radial force on an outer surface of the load ring to reduce hoop stress resulting from radially-offset longitudinal forces on the load ring.

2. The apparatus of claim 1, wherein the compressive radial force is a radial stress.

3. The apparatus of claim 1, wherein the sidewalls of the first portion of the cavity are configured to apply the compressive radial force against the outer surface of the load ring at a reaction end of the load ring.

4. The apparatus of claim 1, wherein the compressive radial force is created without using an interference fit.

5. The apparatus of claim 1, wherein the compressive radial force is created using a press fit between the female connector and the male connector.

6. The apparatus of claim 1, wherein the female connector is configured to mate with the male connector with a connection that is not impeded by the compressive radial force on the load ring.

7. The apparatus of claim 1, wherein the female connector comprises a compressive section forming the first portion of the cavity and having an inner diameter of about 75 millimeters.

8. An apparatus comprising:
   an annular end forming a cavity configured to receive a load ring in a first portion of the cavity and at least a portion of a male connector in a second portion of the cavity; and
   an insert configured to support at least a portion of a conductor extending through a female connector, the load ring, and the male connector;
   wherein sidewalls of the first portion of the cavity are configured to create a compressive radial force on an outer surface of the load ring to reduce hoop stress resulting from radially-offset longitudinal forces on the load ring.

9. The apparatus of claim 8, wherein the compressive radial force is a radial stress.

10. The apparatus of claim 8, wherein the sidewalls of the first portion of the cavity are configured to apply the compressive radial force against the outer surface of the load ring at a reaction end of the load ring.

11. The apparatus of claim 8, wherein the compressive radial force is created without using an interference fit.

12. The apparatus of claim 8, wherein the compressive radial force is created using a press fit between the female connector and the male connector.

13. The apparatus of claim 8, wherein the female connector is configured to mate with the male connector with a connection that is not impeded by the compressive radial force on the load ring.

14. The apparatus of claim 8, wherein the female connector comprises a compressive section forming the first portion of the cavity and having an inner diameter of about 75 millimeters.

15. A method comprising:
   securing a conductor using a load ring received within a cavity of a female connector;
   providing a male connector surrounding at least a portion of the conductor; and
   mating the female connector with the male connector;
   wherein sidewalls of the cavity of the female connector create a compressive radial force on an outer surface of the load ring to reduce hoop stress resulting from radially-offset longitudinal forces on the load ring.

16. The method of claim 15, wherein the compressive radial force is a radial stress.

17. The method of claim 15, wherein the compressive radial force is applied on the outer surface of the load ring at a reaction end of the load ring.

18. The method of claim 15, wherein the compressive radial force is created without using an interference fit.

19. The method of claim 15, wherein the compressive radial force is created using a press fit between the female connector and the male connector.

20. The method of claim 15, wherein the female connector is configured to mate with the male connector with a connection that is not impeded by the compressive radial force on the load ring.

* * * * *